(12) United States Patent  (10) Patent No.: US 8,537,690 B2
Matityahu et al.  (45) Date of Patent: *Sep. 17, 2013

(54) DIRECTOR DEVICE ARRANGEMENT WITH VISUAL DISPLAY ARRANGEMENT AND METHODS THEREOF

(75) Inventors: Eldad Matityahu, Palo Alto, CA (US);
Robert Shaw, Los Gatos, CA (US);
Dennis Carpio, San Jose, CA (US);
Xiaochun Liu, Pleasanton, CA (US);
Randy Fung, San Jose, CA (US);
Siuman Hui, San Francisco, CA (US)

(73) Assignee: Net Optics, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/230,760

(22) Filed: Sep. 12, 2011

(65) Prior Publication Data

US 2012/0002552 A1   Jan. 5, 2012

Related U.S. Application Data

(63) Continuation of application No. 12/705,195, filed on Feb. 12, 2010, now Pat. No. 8,018,856, which is a continuation of application No. 11/965,668, filed on Dec. 27, 2007, now Pat. No. 7,773,529.

(51) Int. Cl.
*H04L 12/26* (2006.01)
(52) U.S. Cl.
USPC .......................................................... 370/241
(58) Field of Classification Search
None
See application file for complete search history.

(56) References Cited

U.S. PATENT DOCUMENTS

| 4,802,161 | A | 1/1989 | Byars et al. |
| 5,173,794 | A | 12/1992 | Cheung et al. |
| 5,539,727 | A | 7/1996 | Kramarczyk et al. |
| 5,550,802 | A | 8/1996 | Worsley et al. |

(Continued)

FOREIGN PATENT DOCUMENTS

| JP | 2001-197066 A | 7/2001 |
| JP | 2006-148886 A | 6/2006 |

(Continued)

OTHER PUBLICATIONS

"Examination Report", EP Patent Application No. EP 08 17 1759, Mailing Date: Jun. 8, 2012.

(Continued)

*Primary Examiner* — Min Jung
(74) *Attorney, Agent, or Firm* — IPSG, P.C. Intellectual Property Law

(57) ABSTRACT

An apparatus for enabling a plurality of monitoring functions to be performed on network data is provided. The apparatus includes a power module and a processor module. The apparatus also includes a set of network ports that includes a set of input network ports for receiving the data traffic and a set of output network ports for outputting the data traffic from the apparatus. The apparatus further includes a switchboard arrangement that includes at least two chips that are configured to interact with one another to perform the plurality of monitoring functions on the data traffic received by the switchboard arrangement. The apparatus yet also includes logic module for analyzing the data traffic and for displaying the statistical data pertaining to the data traffic. The apparatus yet further includes a visual display arrangement that is configured for displaying the statistical data.

20 Claims, 4 Drawing Sheets

(56) References Cited

U.S. PATENT DOCUMENTS

| | | | |
|---|---|---|---|
| 5,648,965 | A | 7/1997 | Thadani et al. |
| 5,696,859 | A | 12/1997 | Onaka et al. |
| 5,710,846 | A | 1/1998 | Wayman et al. |
| 5,715,247 | A * | 2/1998 | Nara et al. ............... 370/360 |
| 5,774,453 | A | 6/1998 | Fukano et al. |
| 5,781,318 | A | 7/1998 | Tremblay |
| 5,825,775 | A | 10/1998 | Chin et al. |
| 5,887,158 | A * | 3/1999 | Sample et al. ............. 716/137 |
| 5,983,308 | A | 11/1999 | Kerstein |
| 6,041,037 | A | 3/2000 | Nishio et al. |
| 6,047,321 | A | 4/2000 | Raab et al. |
| 6,108,310 | A | 8/2000 | Wilkinson et al. |
| 6,167,025 | A | 12/2000 | Hsing et al. |
| 6,272,136 | B1 | 8/2001 | Lin et al. |
| 6,366,557 | B1 | 4/2002 | Hunter |
| 6,424,627 | B1 | 7/2002 | Sorhaug et al. |
| 6,449,247 | B1 | 9/2002 | Manzardo et al. |
| 6,542,145 | B1 | 4/2003 | Reisinger et al. |
| 6,650,803 | B1 | 11/2003 | Ramaswami et al. |
| 6,658,565 | B1 | 12/2003 | Gupta et al. |
| 6,687,009 | B2 | 2/2004 | Hui et al. |
| 6,687,847 | B1 | 2/2004 | Aguilera et al. |
| 6,714,976 | B1 | 3/2004 | Wilson et al. |
| 6,798,740 | B1 | 9/2004 | Senevirathne et al. |
| 6,801,940 | B1 | 10/2004 | Moran et al. |
| 6,823,383 | B2 | 11/2004 | MacBride |
| 6,836,540 | B2 | 12/2004 | Falcone et al. |
| 6,841,985 | B1 | 1/2005 | Fetzer |
| 6,850,706 | B2 | 2/2005 | Jager et al. |
| 6,882,654 | B1 | 4/2005 | Nelson |
| 6,898,630 | B2 | 5/2005 | Ueno et al. |
| 6,898,632 | B2 | 5/2005 | Gordy et al. |
| 6,914,892 | B1 * | 7/2005 | Cooper et al. ............. 370/338 |
| 6,925,052 | B1 | 8/2005 | Reynolds et al. |
| 6,944,437 | B2 | 9/2005 | Yang et al. |
| 6,975,209 | B2 | 12/2005 | Gromov |
| 7,027,437 | B1 | 4/2006 | Merchant et al. |
| 7,171,504 | B2 | 1/2007 | Ishii |
| 7,277,957 | B2 | 10/2007 | Rowley et al. |
| 7,308,705 | B2 | 12/2007 | Gordy et al. |
| 7,321,565 | B2 | 1/2008 | Todd et al. |
| 7,324,553 | B1 | 1/2008 | Varier et al. |
| 7,415,013 | B1 | 8/2008 | Lo |
| 7,430,354 | B2 | 9/2008 | Williams |
| 7,477,611 | B2 | 1/2009 | Huff |
| 7,486,624 | B2 | 2/2009 | Shaw et al. |
| 7,486,625 | B2 | 2/2009 | Matityahu et al. |
| 7,505,416 | B2 | 3/2009 | Gordy et al. |
| 7,573,896 | B2 | 8/2009 | Wang et al. |
| 7,616,587 | B1 | 11/2009 | Lo et al. |
| 7,760,859 | B2 | 7/2010 | Matityahu et al. |
| 7,788,365 | B1 | 8/2010 | Foster et al. |
| 2001/0040870 | A1 | 11/2001 | Ohmori et al. |
| 2002/0003592 | A1 | 1/2002 | Hett et al. |
| 2002/0023184 | A1 * | 2/2002 | Paul ........................... 710/100 |
| 2002/0026374 | A1 | 2/2002 | Moneymaker et al. |
| 2002/0032880 | A1 | 3/2002 | Poletto et al. |
| 2002/0061027 | A1 | 5/2002 | Abiru et al. |
| 2002/0073199 | A1 | 6/2002 | Levine et al. |
| 2002/0087710 | A1 | 7/2002 | Aiken et al. |
| 2002/0110148 | A1 | 8/2002 | Hickman et al. |
| 2002/0146016 | A1 | 10/2002 | Liu et al. |
| 2002/0176355 | A1 | 11/2002 | Mimms et al. |
| 2002/0180592 | A1 | 12/2002 | Gromov |
| 2003/0112760 | A1 | 6/2003 | Puppa et al. |
| 2003/0142666 | A1 | 7/2003 | Bonney et al. |
| 2003/0145039 | A1 | 7/2003 | Bonney et al. |
| 2003/0147385 | A1 | 8/2003 | Montalvo et al. |
| 2003/0184386 | A1 | 10/2003 | Varner et al. |
| 2003/0215236 | A1 | 11/2003 | Manifold |
| 2004/0008675 | A1 | 1/2004 | Basso et al. |
| 2004/0023651 | A1 | 2/2004 | Gollnick et al. |
| 2004/0062556 | A1 | 4/2004 | Kubo et al. |
| 2004/0096227 | A1 | 5/2004 | Bulow |
| 2004/0109411 | A1 | 6/2004 | Martin |
| 2004/0120259 | A1 | 6/2004 | Jones et al. |
| 2004/0128380 | A1 | 7/2004 | Chen et al. |
| 2004/0190547 | A1 | 9/2004 | Gordy et al. |
| 2004/0215832 | A1 | 10/2004 | Gordy et al. |
| 2004/1020216 | | 10/2004 | Hooper et al. |
| 2004/0264494 | A1 | 12/2004 | Kim |
| 2005/0005031 | A1 | 1/2005 | Gordy et al. |
| 2005/0060535 | A1 | 3/2005 | Bartas |
| 2005/0071711 | A1 | 3/2005 | Shaw |
| 2005/0108444 | A1 | 5/2005 | Flauaus et al. |
| 2005/0122910 | A1 | 6/2005 | Parupudi et al. |
| 2005/0129033 | A1 | 6/2005 | Gordy et al. |
| 2005/0132051 | A1 | 6/2005 | Hill et al. |
| 2005/0213512 | A1 | 9/2005 | Konuma et al. |
| 2005/0231367 | A1 | 10/2005 | Bellantoni |
| 2005/0257262 | A1 | 11/2005 | Matityahu et al. |
| 2005/0271065 | A1 | 12/2005 | Gallatin et al. |
| 2006/0083268 | A1 | 4/2006 | Holaday et al. |
| 2006/0083511 | A1 | 4/2006 | Edmunds et al. |
| 2006/0153092 | A1 | 7/2006 | Matityahu et al. |
| 2006/0200711 | A1 | 9/2006 | Schondelmayer et al. |
| 2006/0215566 | A1 | 9/2006 | Walsh |
| 2006/0233115 | A1 | 10/2006 | Matityahu et al. |
| 2006/0282529 | A1 | 12/2006 | Nordin |
| 2007/0002754 | A1 | 1/2007 | Matityahu et al. |
| 2007/0002755 | A1 | 1/2007 | Matityahu et al. |
| 2007/0002769 | A1 | 1/2007 | Matityahu et al. |
| 2007/0064917 | A1 | 3/2007 | Matityahu et al. |
| 2007/0081549 | A1 | 4/2007 | Cicchetti et al. |
| 2007/0081553 | A1 | 4/2007 | Cicchetti et al. |
| 2007/0171908 | A1 * | 7/2007 | Tillman et al. ............. 370/389 |
| 2007/0171966 | A1 | 7/2007 | Light et al. |
| 2007/0174492 | A1 * | 7/2007 | Light et al. ................ 709/250 |
| 2007/0211682 | A1 | 9/2007 | Kim et al. |
| 2007/0213862 | A1 | 9/2007 | Chang et al. |
| 2008/0013467 | A1 * | 1/2008 | Light et al. ................ 370/276 |
| 2008/0014879 | A1 | 1/2008 | Light et al. |
| 2008/0049627 | A1 | 2/2008 | Nordin |
| 2008/0214108 | A1 | 9/2008 | Beigne et al. |
| 2009/0040932 | A1 | 2/2009 | Matityahu et al. |
| 2009/0041051 | A1 | 2/2009 | Matityahu et al. |
| 2009/0168659 | A1 | 7/2009 | Matityahu et al. |
| 2009/0279541 | A1 | 11/2009 | Wong et al. |
| 2010/0146113 | A1 | 6/2010 | Matityahu et al. |

FOREIGN PATENT DOCUMENTS

| | | |
|---|---|---|
| KR | 10-2004-0058415 A | 7/2004 |
| WO | WO-02/19642 A1 | 3/2002 |
| WO | WO-2004/012163 A2 | 2/2004 |

OTHER PUBLICATIONS

"Non Final Office Action", U.S. Appl. No. 12/839,373, Mailing Date: Jun. 7, 2012.

"Written Opinion", Issued in PCT Application No. PCT/US2006/25436, Mailing Date: Mar. 4, 2008.

"international Search Report", Issued in PCT Application No. PCT/US2006/25436, Mailing Date: Mar. 4, 2008.

"International Preliminary Report on Patentability", Application No. PCT/US06/25436, Mailing Date: May 22, 2008.

"Non Final Office Action", U.S. Appl. No. 11/223,477, Mailing Date: Jun. 12, 2008.

"Non Final Office Action", U.S. Appl. No. 11/174,033, Mailing Date; May 29, 2008.

"Final Office Action", U.S. Appl. No. 11/174,033, Mailing Date: Dec. 10, 2008.

"Non Final Office Action", U.S. Appl. No. 11/174,033, Mailing Date: Sep. 15, 2009.

"Final Office Action", U.S. Appl. No. 11/174,033, Mailing Date: Jun. 24, 2010.

"Non Final Office Action", U.S. Appl. No. 11/174,033, Mailing Date: Apr. 28, 2011.

"Non Final Office Action", U.S. Appl. No. 11/174,032, Mailing Date: Apr. 23, 2008.

"Inter Partes Reexamination Office Action", U.S. Appl. No. 95/001,318, Patent in Re-examination: 7,486,625, Mailing Date: Apr. 23, 2010.

"Replacement Statement and Explanation under 37CFR 1.915 in Support of Request for Inter Partes Reexamination of US Patent 7,486,625", Sonnenschein Nath & Rosenthal LLP, Jan. 22, 2010, 251 pages.
"Request for Inter Partes Reexamination of US Patent 7,486,625", Sonnenschein Nath & Rosenthal LLP, Dec. 18, 2009, 69 pages.
Non Final Office Action, U.S. Appl. No. 11/174,238, Mailing Date: Oct. 1, 2008.
"International Preliminary Report on Patentability", Issued in PCT Application No. PCT/US2006/025437, Mailing Date: Jan. 17, 2008.
"international Search Report", Application No. PCT/US2006/25437, Mailing Date: Dec. 6, 2006.
"Written Opinion", Application No. PCT/US2006/25437, Mailing Date: Dec. 6, 2006.
"Non Final Office Action", U.S. Appl. No. 11/370,487, Mailing Date: Mar. 25, 2009.
"Non Final Office Action", U.S. Appl. No. 11/370,487, Mailing Date: Jun. 11, 2009.
"International Search Report", issued in PCT Application No. PCT/US2008/072484, Mailing Date: Feb. 13, 2009.
"Written Opinion", issued in PCT Application No. PCT/US2008/072484, Mailing Date: Feb. 13, 2009.
"International Preliminary Report on Patentability", Issued in PCT Application No. PCT/US2008/072484, Mailing Date: Feb. 18, 2010.
"Non Final Office Action", U.S. Appl. No. 11/835,228, Mailing Date: Sep. 9, 2010.
"International Search Report", issued in PCT Application No. PCT/U52008/072493, Mailing Date: Feb. 13, 2009.
"Written Opinion", Issued in PCT Application No. PCT/US2008/072493, Mailing Date: Feb. 13, 2009.
"International Preliminary Report on Patentability", Issued in PCT Application No. PCT/US2008/072493, Mailing Date: Feb. 18, 2010.
"Non Final Office Action", U.S. Appl. No. 11/835,233, Mailing Date: Jun. 9, 2009.
"Final Office Action", U.S. Appl. No. 11/835,233, Mailing Date: Oct. 30, 2009.
"Non Final Office Action", U.S. Appl. No. 11/835,233, Mailing Date: Jun. 25, 2010.
"International Search Report", Issued in PCT Application No. PCT/US2008/080598, Mailing Date: May 26, 2009.
"Written Opinion", Issued in PCT Application No. PCT/US2008/080598, Mailing Date: May 26, 2009.
"Notice of Allowance and Fees Due", U.S. Apl. No. 11/925,626, Mailing Date: Jun. 18, 2010.
"European Search Report", issued in EP Patent Application No. EP 08 17 1759, Mailing Date: Jul. 31, 2009.
"Notice of Allowance and Fee(s) Due", U.S. Appl. No. 11/965,668, Mailing Date: Oct. 8, 2009.
"Non Final Office Action", U.S. Appl. No. 12/705,195, Mailing Date: Dec. 27, 2010.
"Written Opinion", Issued in PCT Application No. PCT/US2010/037985, Mailing Date: Dec. 31, 2010.
"International Search Report", Issued in PCT Application No. PCT/US2010/037985, Mailing Date: Dec. 31, 2010.
"Non Final Office Action", U.S. Appl. No. 12/481,847, Mailing Date: Nov. 4, 2010.
"Final Office Action", U.S. Appl. No. 12/481,847, Mailing Date: Feb. 9, 2011.
"Non Final Office Action", U.S. Appl. No. 10/834,448, Mailing Date: Mar. 4, 2009.
"Final Office Action", U.S. Appl. No. 10/834,448, Mailing Date: Dec. 9, 2009.
"Non Final Office Action", U.S. Appl. No. 10/834,448, Mailing Date: Feb. 7, 2008.
"Non Final Office Action", U.S. Appl. No. 10/834,448, Mailing Date: Feb. 18, 2010.
"Final Office Action", U.S. Appl. No. 10/834,448, Mailing Date: Aug. 3, 2010.
"Non Final Office Action", U.S. Appl. No. 12/839,373, Mailing Date: Dec. 22, 2011.
"Final Office Action", U.S. Appl. No. 11/174,033, Mailing Date: Jan. 11, 2012.
"International Search Report", PCT Application No. PCT/US2011/026158, Mailing Date: Nov. 30, 2011.
"Written Opinion" PCT Application No. PCT/US2011/026158, Mailing Date: Nov. 30, 2011.
"Non Final Office Action" U.S. Appl. No. 12/174,404, Mailing Date Apr. 2, 2012.
"Final Office Action", U.S. Appl. No. 11/174,033, Mailing Date: Mar. 27, 2012.
Belkin International, Inc., "Belkin Quick Installation Guide", N1 Vision Wireless Router, Belkin International, Inc., Compton, CA, Feb. 11, 2009, 3 pages total.
Belkin International. Inc., "Network Status Display", Belkin International, Inc., Compton, CA, 2007, 1 page total.
HP, et al., "Reduced Gigabit Media Independent interface (RGMII)", Nov. 30, 2005, http://web.archive.org/web/20051113015000/http://www.hp.com/md/pdfs/RGMIIv2_0_final_hp.Pdf.
Wikipedia, "Field-programmable Gate Array", Jan. 21, 2005, http://web.archive.org/web/20050121193052/http://en.wi kiped ia.org/wiki/Field-programmable_gate_array.
XILINX, "LogiCore OPB Ethernet Lite Media Access Controller", y1.01b, Mar. 3, 2006.
"Fast Ethernet Fiber-to-Fiber Converters": Canary Communications, Inc. 7 pages total, 2004.
"Sequence Reducer/ Sequence Mirror Operator's Guide", Peribit Networks, Inc. 13 pages total. 2001-2005.
"PeriScope Central Management System (CMS) 5.0 Administrator's Guide", Peribit Networks, Inc. 13 pages total. 2003-2004.
"VSS Coppertap Literature", VSS Monitoring Inc. 2 pages. 2003-2004.
"VSS Easy Install Guide", VSS Monitoring Inc, 8 pages total, 2003-2005.
"VSS Linksafe", VSS Monitoring Inc., 1 page. 2003-2005.
Anonymous, "100Base—TX/100BBase—FX Media Converters E-10OBTX-FX-04 User's Guide": Transitions Networks, Minneapolis, MN, Copyright 1998-2000, 4 pages.
GIGAMON Systems LLC, "GigaVUE—Product Brief", Gigamon Systems LLC, http://web.archive.org/web/20070815021951/www.gigamon.com/pdf/GigamonSystems-OnePageProductBrief.pdf, Aug. 15, 2007, 1 page.
"Non Final Office Action", U.S. Appl. No. 13/036,842, Mailing Date: Oct. 17, 2012.
"Final Office Action", U.S. Appl. No. 12/839,373, Mailing Date: Nov. 15, 2012.

* cited by examiner

DIRECTOR DEVICE ARRANGEMENT WITH VISUAL DISPLAY ARRANGEMENT AND METHODS THEREOF

PRIORITY CLAIM

This application is a continuation application of and claims priority under 35 U.S.C. §120 to a commonly assigned application entitled "Director Device With Visual Display Arrangement and Methods Thereof," by Matityahu et al., U.S. Pat. No. 8,018,856 issued on Sep. 13, 2011, application Ser. No. 12/705,195, filed on Feb. 12, 2010, which is a continuation application of and claims priority under 35 U.S.C. §120 to a commonly assigned application entitled "Director Device and Methods Thereof," by Matityahu et al., U.S. Pat. No. 7,773,529 issued on Aug. 10, 2010, application Ser. No. 11/965,668, filed on Dec. 27, 2007, which is incorporated by reference herein.

CROSS-RELATED APPLICATIONS

The present invention is related to the following applications, all of which are incorporated herein by reference:

Commonly assigned application entitled "Intelligent Communications Network Tap Port Aggregator," filed on Mar. 7, 2006 herewith by Matityahu et al. and application Ser. No. 11/370,487 (issued as U.S. Pat. No. 7,760,859); and Commonly assigned application entitled "Methods and Arrangement for Utilization Rate Display," filed on Aug. 7, 2007 herewith by Matityahu et al. and application Ser. No. 11/835,233 (issued as U.S. Pat. No 7,903,576).

BACKGROUND OF THE INVENTION

In today's business environment, a company's network may perform an important role in enabling a company to conduct its business. To monitor the network, a company may implement network taps, which are non-intrusive hardware devices that are capable of monitoring network traffic traversing through the network. In a typical network, the number and type of network taps that may be implemented may depend upon the company's network backbone and the monitoring goals of the company.

To facilitate discussion, FIG. 1 shows a simple block diagram of a network 100 with a plurality of network taps (102, 104, 106, 108, and 110). As aforementioned, in a typical business environment, different network taps may be configured to perform different functions. Consider the situation wherein, for example, a stream of data traffic is being received by network tap 102.

Network tap 102 may include a plurality of network ports (112 and 114). In an example, a stream of in-line data traffic, which may include a data packet A may be received by network port 112. Network tap 102 assures connectivity between port 112 and 114 regardless of power availability. By way of example, a passive circuit including a switch may be employed between these ports. The switch may close to create a bypass route between these ports when power is not available. In addition, a copy of data packet A may be sent to one of the monitor ports (116, 118, and 120). Network tap 102 may include a switch arrangement that may determine the routing of data packet A to monitor port 120. Accordingly, the data packet may flow directly out of a monitor port to a monitoring device. However, the data packet may also flow through additional network taps before arriving at the monitoring device.

If data packet A continues to flow to other network taps, as shown in this example, data packet A may be received by a network port 122 of network tap 104. Network tap 104 may be configured for regenerating network traffic that may be received. In an example, before forwarding data packet A to a network port 124, data packet A may be regenerated (i.e., copied). In an example, if each of the monitor ports (126, 128, and 130) is configured to receive a copy of data packet A, then three copies may be made in order to send the copies to the monitor ports. As can be appreciated from the foregoing, a regeneration tap may be utilized when a flow of data traffic may have to be sent to multiple monitoring devices.

Data packet A flowing from monitor port 130 may be received by a network port 132 of network tap 106, which may be configured for aggregating data traffic. In an example, besides receiving data traffic from monitor port 130 of network tap 104, network tap 106 may also be receiving traffic from other sources. In an example, data packet B may be received by a network port 134 and data packet C may be received by a network port 136. Network tap 106 may include a logic arrangement for aggregating the incoming data packets and sending the aggregated traffic out through a monitor port 138. In other words, network tap 106 may be a link aggregator that is configured to send data packets A, B, and C out through monitor port 138.

The data packets A, B, and C may be forwarded to network tap 108, which is similar to network tap 104. Network tap 108 is similar to network tap 104 in that network tap 108 may also be configured to regenerate data packets that may be received by network tap 108. Hence, not only may there be network taps with different functionality; but each type of network taps may be implemented more than once within the network.

The data packets A, B, and C may then be forwarded to network tap 110, which may be configured to perform filtering. Network tap 110 may include a plurality of network ports, including network ports 140 and 142. Besides sending data packets A, B, and C onward, network tap 110 may also include logic arrangement, which may include rules for filtering the data traffic received. In an example, of the three data packets (A, B, and C) received, data packets A and B may be forwarded to a monitor port 144 whereas data packet C may be forwarded to a monitor port 146.

As described in FIG. 1, a plurality of network taps may have to be implemented in order to perform the various different functionalities. Thus, as the complexity of a network increases, the number of network taps that may be needed to monitor the data traffic that may be flowing through the network may also increase. However, in a more complex network environment, the number of network taps that may be implemented may either be limited by rack space availability or may require the company to invest in additional real estate to accommodate the complex network tap configuration. In addition, the task of maintaining the plurality of network taps may require the skill of experienced information personnel (IT). In an example, the task of adding or removing a network tap when a problem arises may be a complicated and tedious task since each network tap may be of different makes and models. Accordingly, the cost and time-spent associated with creating and maintaining a network of network taps may become quite costly.

BRIEF SUMMARY OF THE INVENTION

The invention relates, in an embodiment, to a director device arrangement for enabling a plurality of monitoring functions to be performed on data traffic traversing through a network. The director device arrangement includes a power module for providing power to circuitry of the director device arrangement. The director device arrangement also includes a processor module for providing processing capability to the director device arrangement. The director device arrangement further includes a set of network ports, which includes a set of input network ports for receiving the data traffic and a set of output network ports for outputting the data traffic from the director device arrangement. The director device arrangement yet also includes a set of switch chips, which is configured to include at least a first switch chip and a second switch chip. The first switch chip and the second switch chip interact with one another to perform the plurality of monitoring functions on the data traffic received by the set of switch chips. The director device arrangement yet further includes a set of monitoring ports, which is configured to receive at least one of the data traffic traversing through the network. The data traffic is configured to traverse the director device arrangement between the set of input network ports and the set of output network ports irrespective whether the power is provided to the circuitry of the director device arrangement.

The above summary relates to only one of the many embodiments of the invention disclosed herein and is not intended to limit the scope of the invention, which is set forth in the claims herein. These and other features of the present invention will be described in more detail below in the detailed description of the invention and in conjunction with the following figures.

BRIEF DESCRIPTION OF THE SEVERAL VIEWS OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS

Figure 1:
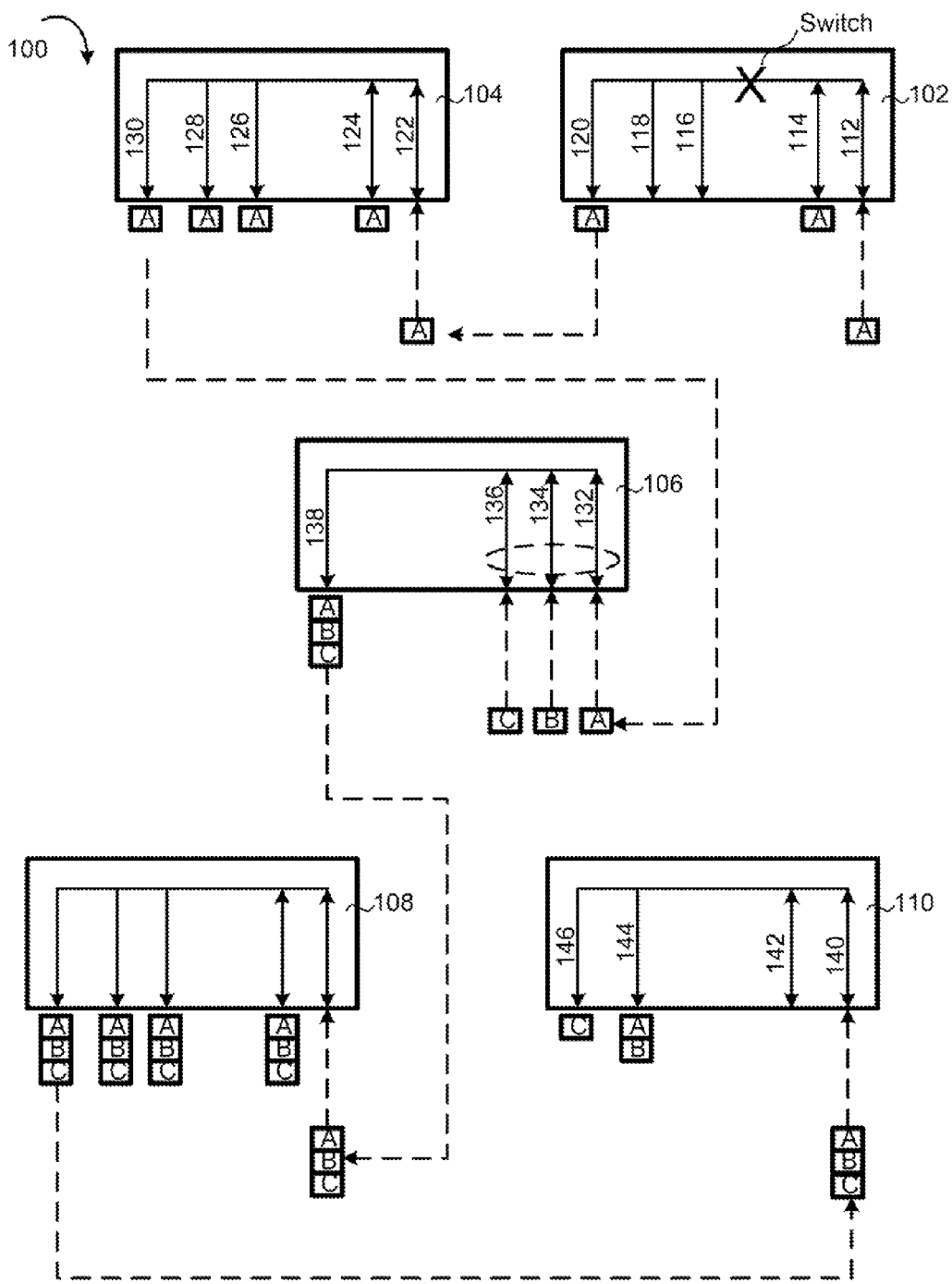
FIG. 1 shows a simple block diagram of a network with a plurality of network taps.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described hereinbelow, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

As aforementioned, the configuration of a network may include a plurality of monitoring devices. In one aspect of the invention, the inventors herein realized that a plurality of network taps is not required in order to accommodate the various different monitoring devices. Instead, the number of network taps may be substantially reduced by integrating at least some of the monitoring functions within a single tap device. In other words, instead of having a network tap for handling regeneration, a second network tap for handling filtering, a third network tap for handling aggregation, and the like, a single tap device may be employed to perform the various different monitoring functions. In accordance with embodiments of the present invention, a director device is provided in which different monitoring functions may be aggregated under a single device.

In an embodiment of the invention, a director device may include a set of switch chips. In contrast to the prior art, the director device may include a set of switch chips that may allow a plurality of monitoring functions to be aggregated within a single device. The set of switch chips (e.g., BCM56314, Broadcom, Irvine, Calif., US) may include logic arrangement for at least interacting with one another, for handling incoming data traffic, for routing the data traffic through the director device, and for performing various different monitoring functions. Additionally or alternatively, the set of switch chips is configurable, thereby enabling the director device to be configured according to a user's specification and requirements.

As can be appreciated from the foregoing, with the set of switch chips, a plurality of monitoring functions which may have been previously handled by a plurality of network taps may now be handled by a single director device. Thus, the amount of physical space that may have previously been required to accommodate the various network taps may now be substantially minimized. Further, with less hardware devices being implemented within a network, the cost associated with maintaining the network tap devices may be substantially reduced.

In this document, various implementations may be discussed using network tap as an example. This invention, however, is not limited to network tap and may include any network and/or security appliances (e.g., routers, switches, hubs, bridges, load balancer, firewalls, packet shaper, and the like). Instead, the discussions are meant as examples and the invention is not limited by the examples presented.

In an embodiment of the invention, a director device may include logic arrangement for enabling network devices of different capability to interact with the director device. In an embodiment, the switch chip of the director device may include logic for converting the incoming and/or outgoing data traffic from 1 gigabit of data into 10 gigabit of data and vice versa. As can be appreciated from the foregoing, with a director device, a company may be able to take advantage of using existing network devices without having to perform expensive upgrade to meet faster 10 gigabit requirement on the network backbone.

In an embodiment, the director device may be implemented as part of a network and/or security appliance, such as a switch (which may include routers, hubs, bridges, load balancer, firewalls, packet shaper, and the like). In an example, as part of a switch, a director device may not only be able to perform the plurality of monitoring functions but may also be configured to analyze the various different data packets and determined how the data packets may be forwarded. In another example, as pan of a router, a director device may be configured to analyze the data packets and determine the best path for forwarding the data packets besides performing monitoring function. In yet another example, a director device implemented as part of a firewall may be configured to both perform monitoring functions and analyze the data packets based on a policy to determine if the data packets may pass through. As can be appreciated from the foregoing, the director device may be implemented as a network tap device or may be incorporated into one or more of the network and security appliances.

The features and advantages of the present invention may be better understood with reference to the figures and discussions that follow.

Figure 2:
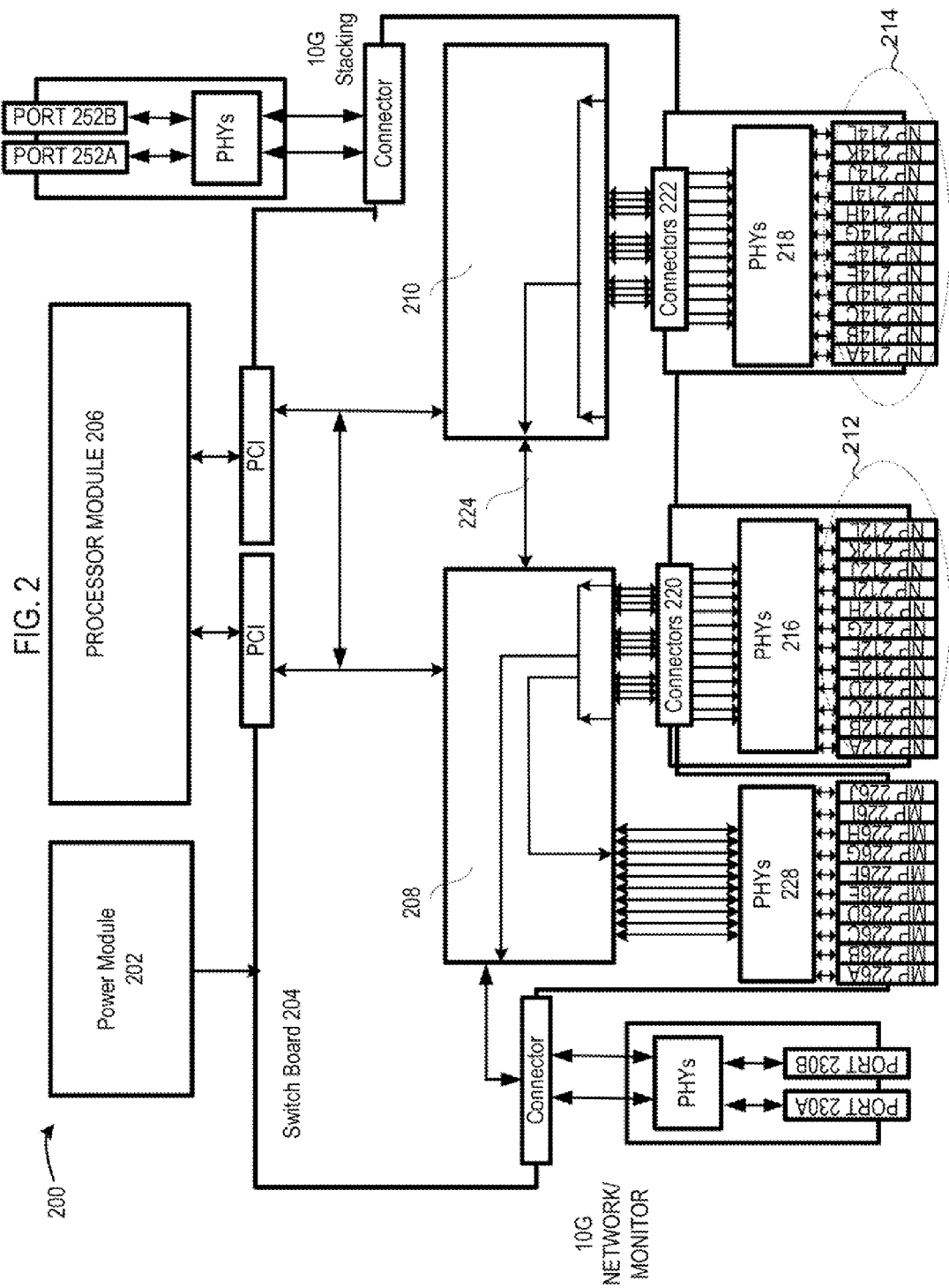
FIG. 2 shows, in an embodiment of the invention, an overall schematic diagram of a director device.

FIG. 2 shows, in an embodiment of the invention, an overall schematic diagram of a director device.

Similar to most network devices, director device 200 may include a power module 202, which may be configured at least for providing power to director device 200. Power module 202 may be configured to couple with switchboard arrangement 204 via a set of connectors. Switchboard arrangement 204 may include a DC (direct current) module for receiving and converting the power received by power module 204.

Also, director device 200 may include a processor module 206, which may be configured at least for providing the processing capability to director device 200. Processor module 206 may be coupled to switchboard arrangement 204 via a set of bus (e.g., peripheral component interconnect bus), thereby enabling processor module 206 to communicate with switchboard arrangement 204.

Switchboard arrangement 204 may include a set of switch chips. In an embodiment, the set of switch chips may include two switch chips 208 and 210 (e.g., BCM56314). Each switch chip may be capable of directing data traffic through director device 200. Director device 200 may also include network port arrangements (212 and 214) for receiving and transmitting data traffic. Switch chip 208 may be configured to handle data traffic flowing from network ports 212A-212L) through a set of physical layer interfaces (PHYs) 216 and a set of connectors 220. Similarly, switch chip 210 may be configured to handle data traffic flowing from network ports (214A-214L) through a set of PHYs 218 and a set of connectors 222.

As can be appreciated from the foregoing, the number of network ports that may be coupled to a switch chip may depend upon the capability of the chip. In an example, if a switch chip is capable of handling 12 gigabits of data, then the switch chip may be capable of handling up to 12 network ports, if each network port is capable of supporting 1 gigabit of data. However, if the network port is designed to handle up to 10 gigabits of data, then the switch chip may only be able to handle 1 network port. Accordingly, the configuration of the network port may depend upon a manufacturer's preference.

Data traffic may traverse through one network port and out another network port. In an example, data may flow into network port 212A, through one of set of PHY 216 and one of set of connectors 220 to be received by a switch chip 208. Switch chip 208 may route data; traffic back out through one of set of connectors 220 and one of set of PHYs 216 and out through network port 212L. For in-line traffic, each pair of network ports is defined as network pair, for example 212A and 212B. If power module 202 is present, traffic from port 212A may be re-directed to any port from 212A to 212L. However, without power module 202, traffic is usually connected according to network pairing (212A and 212B).

In an embodiment, switch chip 208 and 210 may be coupled together via a set of connectors 224 or direct (printed circuit board) PCB traces, thereby enabling data traffic to flow between the two switches. In an embodiment, set of connectors 224 may be capable of handling high traffic capacity, thereby enabling a large amount of data to be transmitted through set of connectors 224. In an example, if each of the network ports is capable of receiving up to 1 gigabit of data, then at any one time, up to 12 gigabits of data may be flowing to a switch chip. Thus, connector 224 may have to be a large enough pipeline to enable data to be transmitted between the two switch chips with minimal delay.

In an embodiment of the invention, director device 200 may also be configured for monitoring data traffic flowing through the network. In an embodiment, director device 200 may include a set of monitor ports (226A-226J) and a set of PHYs 228. In an example, data traffic flowing through the network ports may be copied and directed by one of the switch chip (208, 210) toward one or more of the monitors. Although both switch chips may be capable of directing traffic toward the monitors, switch chip 208 may be configured to be the primary chip. As the primary chip, switch chip 208 may be configured to include a logic arrangement for performing most of the monitoring functions In yet another embodiment, director device 200 may include a set of ports (230A and 230B). Set of port 230A and 230B may be configured for receiving and sending data packets that may be up to 10 gigabit. By having a set of ports capable of supporting 10 gigabit, director device 200 may be capable of interacting with network devices that may be on a different network backbone and/or have different capability. In an example, director device 200 may be on a 1 gigabit network. However, director device 200 may be coupled to a monitoring device that is capable of accepting up to 10 gigabit of data. To enable the 10 gigabit device to receive the data traffic, the 10 gigabit device may be coupled to director device 200 via a 10 gigabit set of ports (230A and 230B).

In yet another embodiment, director device 200 may include a set of ports 252A and 252B. In an embodiment, set of ports 252N/252B may be a second set of ports capable of supporting up to 10 gigabit of data. Thus, by including set of ports 252A/252B, director device 200 may be configured for receiving and sending data packets to other director devices, thereby enabling stacking to occur. By way of example, multiple devices may be stacked (e.g., cascaded) via the use of set of ports 252A/252B.

As can be appreciated from the foregoing, director device 200 may be comprised of a plurality of different components. Each of the components may be modularized in order to enable each component to be serviced and/or repaired (such as fix and/or replaced) if the component is not functioning properly. In an example, if power module 202 is malfunctioning, power module 202 may be easily removed and replaced with another power module.

Figure 3:
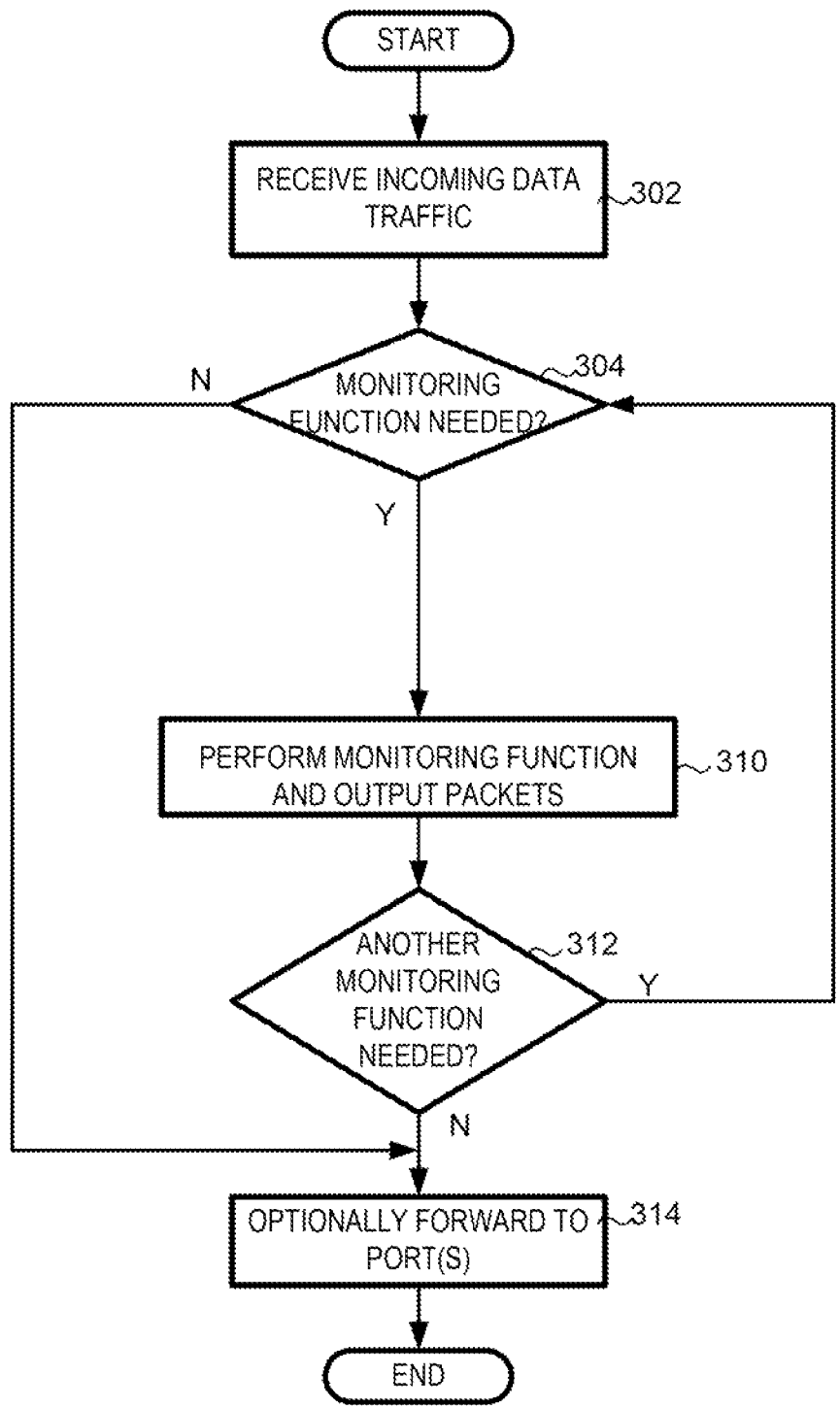
FIG. 3 shows, in an embodiment of the invention, a simple flow diagram illustrating some of the monitoring functions that a director device may perform.
Figure 4:
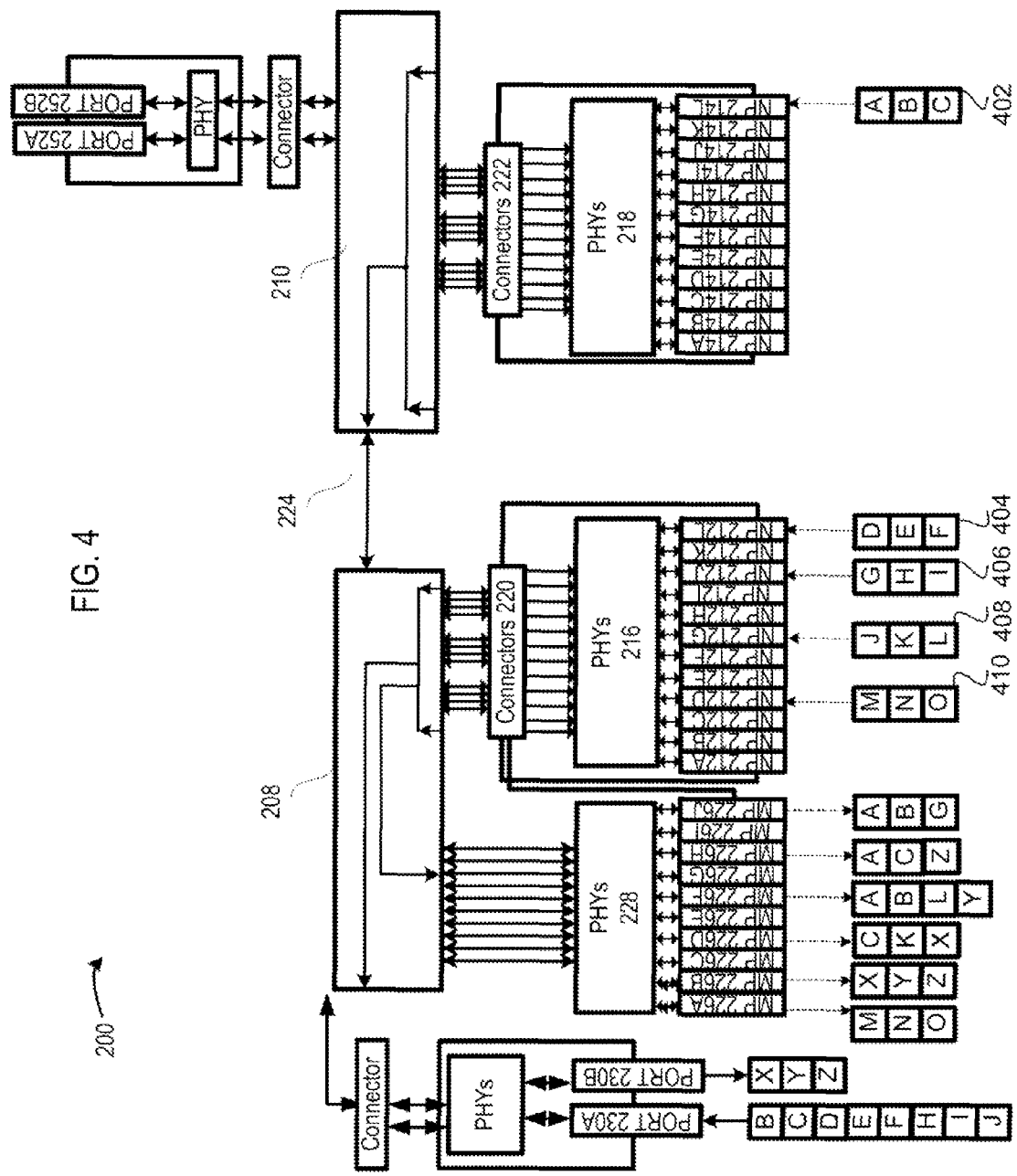
FIG. 4 shows, in an embodiment of the invention, a simple block diagram of a director device with incoming data traffic.

FIG. 3 shows, in an embodiment of the invention, a simple flow diagram illustrating some of the monitoring functions that a director device may perform. To facilitate discussion, FIG. 3 will be discussed in relation to FIG. 4, which shows, in an embodiment of the invention, a simple block diagram of a director device with incoming data traffic.

Consider the situation wherein, for example, a plurality of data traffic (402, 404, 406, 408, and 410) is being received by director device 200.

At a first step 302, a plurality of data traffic is being received by one or more network ports of director device 200. In an example, data traffic 402 may be received by network port 214L. In another example, data traffic 404 may be received by 212L. Each data traffic may include a plurality of data packets. In an example, data traffic 402 may include data packets A, B, and C. In another example, data traffic 404 may include data packets D, E, and F.

At a next step 304, a switch chip within the director device may determine whether monitoring functions may need to be performed. In an embodiment, a plurality of monitoring functions may be performed by a director device. Monitoring function may include but are not limited to, making a copy, switching, aggregating, regenerate, filtering, packet inspection, packet slicing (e.g., changing the packet size to accommodate a particular device bandwidth requirement), and the like. The type of monitoring functions that may be performed and/or the order in which the monitoring functions may be performed may depend upon user's configuration.

If no monitoring function needs to be performed, then the data traffic may be forwarded to the network ports (314).

However, if monitoring functions need to be performed, then a next step 310, the switch chip may perform a monitoring function on the network traffic. In an example, the switch chip may have logic that request that data traffic 402 being received through network port 408 to be regenerated before being forwarded.

At a next step 312, the switch chip may determine if another function may have to be performed. In the example above, once data traffic 402 has been regenerated, the switch chip may check to see if another monitoring function may need to be performed before forwarding data traffic 402 to the designated monitors.

If, no addition monitoring functions need to be performed, then the switch chip may return to step 304. Accordingly, steps 304-312 are reiterative steps that may be performed until each monitoring function has been performed for the data traffic. Once all monitoring functions have been performed, then at a next step 314, the data traffic may optionally be forwarded to the designated ports (e.g., for inline and/or non-spam traffic).

One or more embodiments of the present invention provide for a director device that seemingly integrates a plurality of monitoring functions within a single device. Consider the situation wherein, for example, director device 200 is receiving a plurality of data traffic (data traffic 402, data traffic 404, data traffic 406, data traffic 408, and data traffic 410). See Table 1 below for how the data traffic should be handled in this example.

TABLE 1

Data Traffic and Monitoring Functions

| Network Port | Description | Monitoring Function(s) |
| --- | --- | --- |
| Network port 214L | Data traffic 402 receive with data packets A, B, and C | Regenerate 2 times<br>Data packet A to be sent to monitor ports 226J, 226H, and 226F.<br>Data packet B to be sent to monitor ports 226J and 226F and port 230A.<br>Data packet C to be sent to monitor ports 226H and 22DF and port 230A. |
| Network port 212L | Data traffic 404 receive with data packets D, E, and F | Data packets D, E, F to be sent to port 230A |

TABLE 1-continued

Data Traffic and Monitoring Functions

| Network Port | Description | Monitoring Function(s) |
| --- | --- | --- |
| Network port 212J | Data traffic 406 receive with data packets G, H, and I | Data packet G to be sent to monitor port 226J.<br>Data packets H and I to be sent to port 230A. |
| Network port 212G | Data traffic 408 receive with data packets J, K, and L | Data packet J to be sent to port 230A.<br>Data packet K to be sent to monitor port 226D.<br>Data packet L to be sent to monitor port 226F. |
| Network port 212D | Data traffic 410 receive with data packets M, N, and O | Data packets M, N, and O to be sent to monitor port 226A. |
| Network port 230B | Data traffic 411 receive with data packets X, Y, and Z | Data packets X, Y, and Z to be sent to monitor ports 226B, 226F, 226H, and 226J. |

In an embodiment, the set of switch chips is configurable, thereby enabling the director device to be configured according to a user's specification and requirements. In an example, a user may configure the switch chip to perform regeneration on data traffic 402 that is received by network port 214L. Since network port 214L is coupled to switch chip 210, which is not configured to perform monitoring functions, in an embodiment, switch chip 210 may forward data traffic 402 to switch chip 208 via connector 224. As can be appreciated from the foregoing, switch chips 208 and 210 may be of the same make and model. However, switch chip 208 may include logic arrangement for performing monitoring functions whereas switch chip 210 may not be configured to perform one or more of the monitoring functions, in an embodiment. Upon receiving data traffic 402, switch chip 208 may be configured to regenerate 2 copies of data traffic 402. In other words, after regeneration, three copies of data packets A, B, and C may be available.

The user may also configure switch chip 208 to aggregate data packets A, B, and C with the data traffic received by network ports 212L, 212J, and 212G. In an embodiment, switch chip 208 may include a logic arrangement for performing aggregation. In an example, when data traffic 402, 404, 406, and 408 are received by switch chip 208, switch chip 208 may aggregate the data traffic, thereby creating a long string of data packets (3 data packets A, 3 data packets B, 3 data packets C, and data packets D, E, F, G, H, I, J, K, and L).

After aggregation, switch chip 208 may be configured to perform filtering on the data traffic. In an example, a monitoring device (e.g., such as one employed to monitor emails) coupled to monitor port 226J may only be interested in receiving data packets A, B, and G. To extract only the data packets that may be relevant to monitor port 226J, switch chip 208 may include a filtering logic that enables switch chip 208 to extract data packets A, B, and G. Similarly, switch chip 208 may include another filtering logic that may enable switch chip 208 to filter out data packets A and C to be sent to monitor ports 226H.

Accordingly, a switch chip may be configured to perform a plurality of monitoring functions on data packets received before forwarding the data packets to the intended monitor ports. However, the switch chip may also be configured to perform one monitoring function. In an example, switch chip 208 is configured to forward data traffic 410 to monitor port 226A.

As aforementioned, director device 200 may include a 10 gigabit monitor port, such as set of ports 230A/230B. With a set of monitor ports capable of handling 10 gigabits of data traffic, a director device may be capable of interacting with network devices that may reside on a different network backbone (e.g., 10 gigabits network backbone instead of a 1 gigabit network backbone) and/or network devices that may have different capability. In an example, director device 200 may be located on a 1 gigabit network backbone. However, director device 200 may be interacting with network devices that may be residing on a 10 gigabits network backbone.

In this example, a 10 gigabit port may be configured as a monitoring port to forward data packets B, C, D, E, F, H, I, and J. The 10 gigabit monitoring port may be coupled to one of the 1 gigabit monitor ports. However, traffic congestion may occur causing delay in transmission and/or loss of data packets. To forward the aggregate data traffic out, the monitor device may be coupled to the 10 gigabit port 230A, thereby enabling the aggregate data traffic to be forwarded to the 10 gigabit monitoring device.

In this example, the 10 gigabit port 230B may also be configured as a network port to receive data packets X, Y, and Z. The 10 gigabit network port device may be distributed to one of the 1 gigabit monitor ports. However, traffic congestion may occur causing delay in transmission and/or loss of data packets. To forward the data traffic out, the monitor device may be coupled to the 1 gigabit port 226B, thereby enabling the 10 G data traffic to be forwarded to the 1 gigabit monitoring devices.

In an embodiment, director device 200 may also be configured to handle a large amount of data traffic that may be sent from a single port. In an example, set of ports 230A/230B may be coupled to a 10 gigabit network device. The amount of data that may be sent from the 10 gigabit network device may be up to 10 gigabits of data. In the prior art, a switch chip is only able to handle 8 gigabit of data. Thus, data packets may have been dropped or additional functionality may have to be implemented by the network device in order to limit the amount of data that may be transmitted. The inventors herein realized that by performing filtering on the data traffic received through the 10 gigabit port, the switch chip is able to convert 10 gigabits of data into more manageable packets, such as data packets that may be 1 gigabit or less. In an example, 10 gigabit of data may be received by switch chip 208. Switch chip 208 may activate one or more filtering logic to filter out the data packets, thereby creating a 1 gigabit or less of data traffic that may be forwarded to a particular monitor port. Thus, by including a logic arrangement in which filtering is performed by a switch chip on data traffic that may be received by a 10 gigabit port, the switch chip is able to maximize the amount of data traffic that director device 200 may be able to handle.

As can be appreciated from the forgoing, one or more embodiments of the present invention provide for a director device and methods thereof. With a director device, the various different monitoring functions that may have been previously handled by a plurality of network taps may now be aggregated within a single device. Thus, time and resources that may be required to manage and store a plurality of network taps may be substantially reduced. In addition, the director network provides for conversion, thereby enabling devices of different capabilities (e.g., 1 gigabit network device vs. a 10 gigabit network device) to interact with one another. Thus, a company does not have to upgrade its network backbone in order to utilize network devices that may have higher capacity.

In another aspect of the invention, the inventors realized that a network and/or security appliances may collect a plurality of statistical data about a company's network, including the network bandwidth at a particular port. Traditionally, statistical data collected is not readily available. In an example, to retrieve the statistical data, IT personnel may have to log onto the system in order to access the data.

The inventors herein realized that if the data is visually displayed in an onboard physical display, the IT personnel may quickly access the health of each component of the network without being required to log onto the system to retrieve the information. In accordance with embodiments of the invention, a network device and/or security appliance, such as a director device, with a visual performance display arrangement is provided. Embodiments of the invention also include methods for calculating and displaying network parameters for the network device and/or security appliance.

In accordance with embodiments of the invention, a network device and/or security appliance with a visual performance display arrangement is provided. Embodiments of the invention also include methods for calculating and displaying a utilization rate for a network port. As discussed herein, a utilization rate refers to the actual throughput of a network port.

In this document, various implementations may be discussed using utilization rate as an example. This invention, however, is not limited to utilization rate and may include any network parameters. Instead, the discussions are meant as examples and the invention is not limited by the examples presented.

In this document, various implementations of the display for network parameters may be discussed using director device as an example. The invention is not limited to a director device and may be implemented with any network and/or security appliances (e.g., routers, switches, hubs, bridges, load balancer, firewalls, packet shaper, and the like) that may or may not incorporate a director device. In an example, the display for network parameters may be implemented with a switch that may include a director device. However, the display for network parameters may also be implemented with other type of switches, such as traditional switches that do not include functionality support by a director device. Similarly, a firewall may include a visual performance display arrangement. The firewall, in one embodiment, may include a director device. In another embodiment, the firewall may include the visual performance display arrangement without having the functionality supported by the director device. Instead, the discussions are meant as examples and the invention is not limited by the examples presented.

In an embodiment of the invention, a network device and/or security appliance, such as a director device, with a visual performance display arrangement may be provided for displaying vital network parameters. Examples of network parameters may include, but are not limited to, real-time utilization rate of network capacity, average utilization rate, highest peak of traffic peaks, traffic types, fault conditions, and the like. In an embodiment of the invention, the visual display arrangement may display the network parameters for each of the ports, regardless if the port is a network port or a monitoring port. In other words, the visual display arrangement may display network parameters even if the monitoring function (i.e., tap functions) is dormant. The network parameters may be displayed in text and/or graphically. As can be appreciated from the foregoing, the network parameters may be visually available without requiring IT personnel to log in to retrieve the data, thereby increasing the efficiency of the IT personnel and decreasing response time for handling network anomalies.

As can be appreciated from the foregoing, a plurality of network parameters may be available. In an embodiment of the invention, a logic arrangement (e.g., such as an FPGA (field-programmable gate array), an application-specific integrated circuit (ASIC), complex programmable logic device (CPLD), and the like) may be employed to analyze the network parameters and to generate the statistical data. As can be appreciated from the foregoing, the logic arrangement that may be employed to perform the analysis and to calculate the statistical data may vary depending upon the manufacturing preference. In an example, the logic arrangement may include a single programmable component (such as a FPGA). In another example, the logic arrangement may be a set of programmable components (such as a set of FPGAs), with each programmable component being configured to perform different function. In yet another example, the logic arrangement may include a set of programmable components (such as a set of FPGAs) and a set of programmable digital electronic component (such as a set of microprocessors).

A network parameter that is commonly employed to quickly determine the status of a port is a utilization rate (i.e., throughput or bandwidth rate). To determine the utilization rate, the logic arrangement may be configured to include a set of counters for each port. In an embodiment, a board processor on a PCI bus may read the set of counters provided by a switch chip (e.g., switch chip BCM56314). In an embodiment, the processor may read the initial value from a Receive_ Packet_Count counter. After reading the initial value, the processor may wait for a pre-defined period of time and read the counter again. In an embodiment, the processor is configured to calculate the difference between the first time period and the second time period. In other words, the processor is configured to determine the number of packets (i.e., total_rx_packets) received during the pre-defined period.

Similarly, the processor may also read the initial value from a Total_Receive_Packet_Bytes counter. Again, the processor may wait for a pre-defined period of time before reading the counter again. In an embodiment, the processor is configured to calculate the difference during the pre-defined time period by calculating the number of total bytes (i.e., total_rx_bytes) received.

$$\text{Utilization rate} = (\text{total\_rx\_packets}*20 + \text{total\_rx\_bytes}*8)/10{,}000{,}000*100\% \quad \text{(Equation 1)}$$

In an embodiment, the utilization rate may be calculated by applying the two numbers (total number of packets received and the total number of bytes received) to a mathematical expression. Applying Equation 1 above, the utilization rate may be determined. Based on Equation 1, the total_rx_bytes is converted to bits by multiplying the bytes value by eight. Also, the total_rx_packets is multiple by twenty to account for a minimum number of interframe gap and a frame checked sequence.

In an embodiment, a user (e.g., IT personnel) may be able to set a threshold for the utilization rate. If the threshold is exceeded, a visual warning, such as a LED (light-emitting diode) emission, or a SNMP (simple network management protocol) message may be sent to the IT personnel. With an active response system, the IT personnel may be able to promptly address the issue when the utilization rate exceeds the threshold. In an embodiment, the utilization rate may be employed as a trigger to initiate other actions automatically, such as data logging or data streaming to data storage or an application.

In an embodiment of the invention, the network device and/or security appliance, such as a director device, may include a visual performance display arrangement. In an embodiment, the visual display arrangement may be an LCD (liquid crystal display) screen. As can be appreciated from the foregoing, the size of the visual display arrangement may be dependent upon a manufacturer's configuration preference. In an example, the size of the LCD screen may depend upon the size of the director device.

As can be appreciated from the foregoing, the network parameters that may be displayed on visual display arrangement may be data that may aid IT personnel in performing their task of maintaining and/or monitoring a company's network. Although utilization rates have been utilized as examples for implementing a network device and/or security appliance, such as director device, with a visual performance display arrangement, other network data parameters may also be shown. Examples of type of technical and diagnostic data that is displayed may include, but are not limited to, real-time utilization level for each path of a network link, size and time of the greatest traffic peaks, SNMP traps for system/link/power, average percent utilization of network capacity, counters for total packets, total bytes, and the like.

In an embodiment, network data may be updated periodically to visually display the real-time data. In another embodiment, the data parameters that may be displayed may be cycled. In other words, the amount of data parameters that may be viewed may be limited to the visual display arrangement. To enable the different data parameters to be viewed, different methods may be employed to determine when the network data may be cycled. In an example, data parameters may be displayed for a pre-set time period. In another example, a control component, such as a button or a rolling wheel, may be utilized to enable the IT personnel to select the desired data parameters. As can be appreciated from the foregoing, the mode in which the data parameters may be displayed may vary. In an example, the network data may be shown as text. In another example, the network data may be shown graphically (e.g., charts, bar graphs, etc.).

As can be appreciated from the foregoing, one or more embodiments of the present invention provide for methods and apparatuses for displaying network parameters on a network device and/or security appliance. By visually displaying the network parameters, instantaneous network data parameters may be readily available to the IT personnel at the network device and/or security appliance. Thus, efficiency may increase and cost may decrease by making the network data parameters visually accessible. Furthermore, it is contemplated that custom configuration may be exported to an external media storage device through an interface (e.g., USB or network interface)

While this invention has been described in terms of several preferred embodiments, there are alterations, permutations, and equivalents, which fall within the scope of this invention. Although various examples are provided herein, it is intended that these examples be illustrative and not limiting with respect to the invention.

Also, the title and summary are provided herein for convenience and should not be used to construe the scope of the claims herein. Further, the abstract is written in a highly abbreviated form and is provided herein for convenience and thus should not be employed to construe or limit the overall invention, which is expressed in the claims. If the term "set" is employed herein, such term is intended to have its commonly understood mathematical meaning to cover zero, one, or more than one member. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. An apparatus for enabling a plurality of monitoring functions to be performed on data traffic traversing through a network, comprising:
   a power module for providing power to circuitry of said apparatus;
   a processor module for providing processing capability to said apparatus;
   a set of network ports, said set of network ports including a set of input network ports for receiving said data traffic and a set of output network ports for outputting said data traffic from said apparatus;
   a switchboard arrangement, said switchboard arrangement including at least a first switch chip and a second switch chip, said first switch chip and said second switch chip interacting with one another to perform said plurality of monitoring functions on said data traffic received by said switchboard arrangement;
   logic module for analyzing said data traffic and for displaying statistical data pertaining to said data traffic; and
   a visual display arrangement, said visual display arrangement being configured to display said statistical data, whereas said data traffic is configured to traverse between said set of input network ports and said set of output network ports irrespective whether said power is provided to said circuitry, said processor module, and said switchboard arrangement of said apparatus.

2. The apparatus of claim 1 further including a set of monitoring ports, said set of monitoring ports being configured to receive at least one of said data traffic traversing through said network, whereas said data traffic is configured to traverse said apparatus between said set of input network ports and said set of output network ports.

3. The apparatus of claim 2 wherein at least one of said power module, said processor module, said set of network ports, and said set of monitoring ports is modularized to facilitate repair in a modularized manner.

4. The apparatus of claim 2 wherein said logic module is at least one of
   a single programmable component,
   a set of programmable components, wherein each programmable component of said set of programmable components is configured to perform different function, and
   a set of programmable digital electronic components.

5. The apparatus of claim 4 wherein said logic module is at least one of
   a field-programmable field arrays (FPGA),
   an application-specific integrated circuit ASIC), and
   a complex programmable logic device (CPLD).

6. The apparatus of claim 2 wherein said visual display arrangement include an LCD (liquid crystal display) screen.

7. The apparatus of claim 2 wherein said statistical data displayed on said visual display arrangement is configured to be cycled through to enable different data parameter to be displayed.

8. The apparatus of claim 7 wherein said statistical data includes real-time utilization rate of network capacity, average utilization rate, highest peak of traffic peaks, traffic types, and fault conditions.

9. The apparatus of claim 6 wherein said statistical data is displayed as text.

10. The apparatus of claim 6 wherein said statistical data is displayed graphically.

11. The apparatus of claim 6 wherein said logic module is configurable enabling a threshold to be set for each data parameter, wherein a visual warning is provided when said threshold is exceeded.

12. The apparatus of claim 6 wherein said apparatus is at least one of a switch, a router, and a network tap.

13. The apparatus of claim 2 wherein each network port of said set of network ports is capable of receiving and sending up to one gigabit of data.

14. The apparatus a claim 2 wherein said first switch chip and said second switch chip are coupled via a connector, said connection being capable of handling said data traffic flowing between said first switch chip and said second switch chip.

15. The apparatus of claim 2 wherein each switch chip of said switchboard arrangement includes a logic arrangement for handling at least a portion of said plurality of monitoring functions.

16. The apparatus of claim 15 wherein said logic arrangement is configurable, thereby enabling said plurality of monitoring functions to be configured to a user's specification.

17. The apparatus of claim 16 wherein said plurality of monitoring functions includes at least one of a regeneration function, a filtering function, a forward function, an aggregation function, and a conversion function.

18. The apparatus of claim 1 wherein at least one port of said set of network ports is configured for at least performing one of receiving and sending up to ten gigabits of data.

19. The apparatus claim 18 wherein said switchboard arrangement includes a logic arrangement for filtering said data traffic received by said at least one port of said set of network ports thereby enabling said apparatus to receive said up to ten gigabits of data, and convert said up to ten gigabits of data into a plurality of data packets of at most one gigabit of data.

20. The apparatus of claim 18 wherein said switchboard arrangement includes a logic arrangement for aggregating said data traffic into a set of data packets of said up to ten gigabits of data capable of being sent through said at least one port of said set of network ports.

* * * * *